July 10, 1934.  R. S. SANFORD  1,966,140
BRAKE
Filed June 25, 1931   2 Sheets-Sheet 2

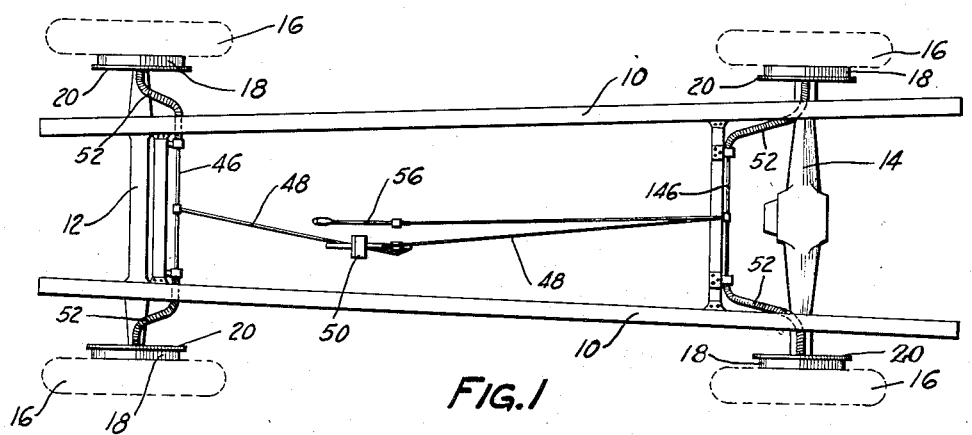
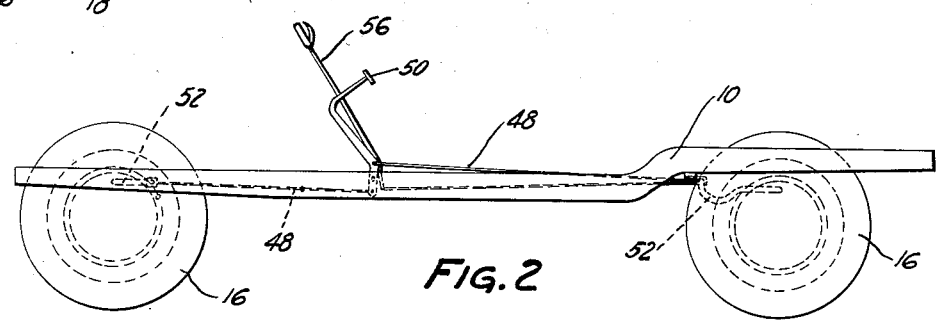
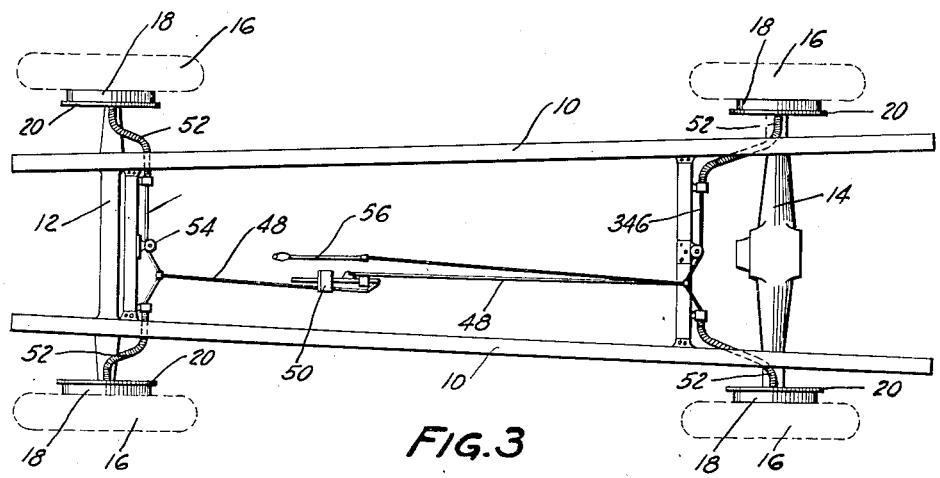

INVENTOR.
ROY S. SANFORD
BY
*Jn. W. McConkey*
ATTORNEY.

Patented July 10, 1934

1,966,140

UNITED STATES PATENT OFFICE 1,966,140

BRAKE

Roy S. Sanford, South Bend, Ind., assignor to Bendix Brake Company, South Bend, Ind., a corporation of Illinois Application June 25, 1931, Serial No. 546,831

5 Claims. (Cl. 188—204)

This invention relates to brakes, and is illustrated as embodied in a system of cable connections for a set of four-wheel internal automobile brakes.

An object of the invention is to provide means in the hookup automatically compensating for the variable action at different points in their strokes of the applying devices in the brakes. This is especially desirable where the applying devices are toggles, as toggles vary rapidly as their positions change, becoming much more powerful and moving the brake parts correspondingly more slowly as they approach a straightened position. Preferably a pair of the brakes are connected by means, such as a transverse cable actuated like a bowstring, which have parts forming in effect an inverse toggle, i. e. one which moves away from straightened position as the brakes are applied. Thereby the inverse toggle automatically compensates for the varying action of the brake-applying toggles, and a substantially uniform leverage is secured in the brake system regarded as a whole.

Other objects and features of the invention, including various novel structural features and desirable arrangements of the parts, will be apparent from the following description of the illustrative embodiment shown in the accompanying drawings, in which:

Figure 1 is a top plan view of an automobile chassis, showing one form of simplified hookup contemplated by the invention;

Figure 2 is a diagrammatic longitudinal section through the chassis of Figure 1;

Figure 3 is a plan view, corresponding to Figure 1 but showing a modification of the hookup;

Figure 4:
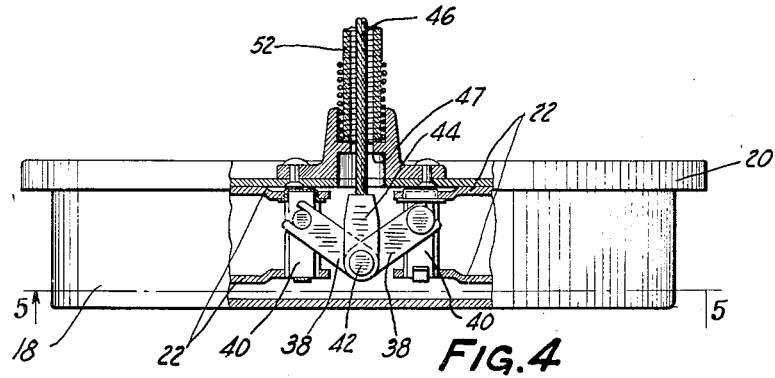
Figure 4 is a top plan view of one brake, broken away to show the brake-applying toggle.

The illustrated automobile chassis includes a frame 10 supported, through the usual front and rear springs, on a front axle 12 and a rear axle 14 carried by road wheels 16. Each of the road wheels is provided with a brake comprising a drum 18 secured to and rotating with the wheel, and a non-rotating backing plate 20 carried by the rear axle or by one of the knuckles at the end of the front axle, as the case may be. The drum and backing plate together form a housing for the friction means of the brake and an applying device therefor.

Figure 5:
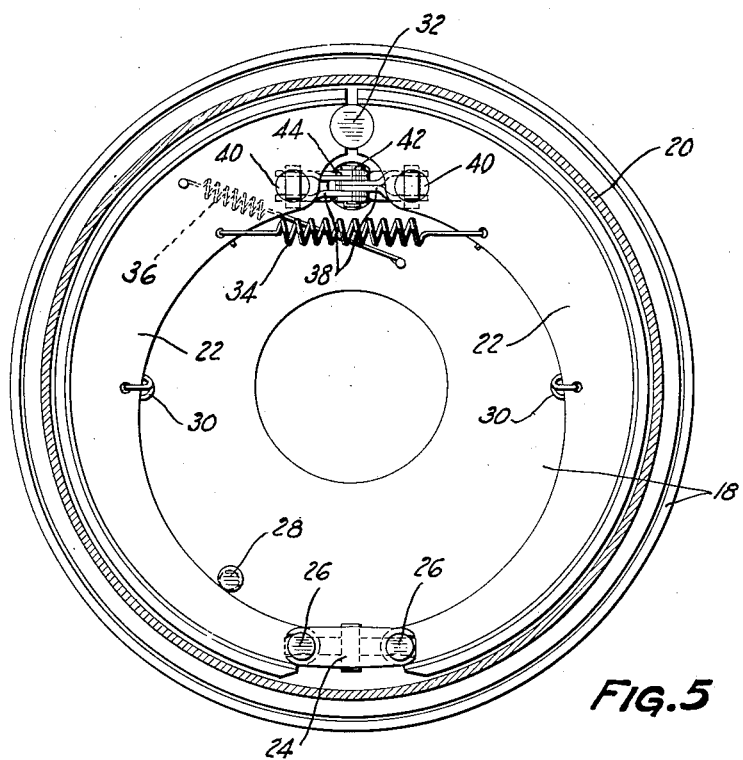
Figure 5 is a vertical section through the brake, on the line 5—5 of Figure 4.

One of the brakes is illustrated in Figures 4 and 5. This particular brake includes, in combination with the drum and backing plate and arranged in the housing or brake chamber formed by the drum and backing plate, a friction device shown as comprising a pair of shoes 22, faced with the usual friction lining, and which are connected by a suitable adjustment such as a link 24 having right and left threads at its ends and threaded into pivots 26 carried by the shoes. The shoes are shown as channel-shaped, i. e. as having each a pair of spaced stiffening webs as shown in Figure 4. One or more suitable positioning stops, such as an adjustable eccentric 28, may be provided, also suitable anti-rattle or steady-rest springs 30 tensioned between the shoes and the backing plate.

The illustrated brake is of the shiftable-anchorage type, i. e. when the drum is turning clockwise the left-hand shoe 22 anchors against a fixed post 32 carried by the backing plate, while when the drum is turning counter-clockwise the right-hand shoe 22 anchors against this anchor post 32. The shoes are spread apart, to apply the brake, against the resistance of a return spring 34 tensioned between the shoes, and an auxiliary return spring 36 may be tensioned between the backing plate and the upper end of the left-hand shoe, to insure that when the vehicle is moving forward (drum turning clockwise) this left-hand shoe will remain in engagement with the anchor throughout the operation of applying the brake.

The brake-applying means is shown as a horizontal toggle including links 38 pivoted to thrust members 40 carried by the ends of the shoes, and having a common pivot or knuckle 42 connected to or forming a part of a fitting 44 secured fixedly on the end of a transverse operating cable 46. It will be observed that the toggle moves, in applying the brake, at right angles to the backing plate, and toward the backing plate and also toward the opposite brake. In applying the brake it also moves toward a straightened position, but is prevented from moving past the straightened position by a stop 47 in the bracket fastened to the backing plate.

A toggle such as described has advantages as a brake-applying device, but it also has the disadvantage that its action is a rapidly-changing variable, the power increasing and the effective motion decreasing rapidly as the toggle approaches a straightened position and the brake approaches its applied position. According to an important feature of this invention, this is automatically substantially compensated for by using in the operating hookup means forming in effect an inverse toggle, i. e. a toggle which moves away from straightened position in applying the brake.

Preferably this is accomplished by connecting the cable 46 (or 146 of the rear brakes) between the right and left brakes, and providing means such as a cable or the like actuator 48 connecting it to the pedal 50 and which pulls on the cable 46 (or 146) transversely, like a bowstring, and forming in effect an inverse toggle as described above, the links of the inverse toggle being the portions of the cable on opposite sides of the actuator cable 48.

I prefer to house the outer ends of cables 46 and 146 in flexible Bowden-type housings 52 secured at their ends to the brake backing plates and to the chassis frame, and forming means constraining the cable ends to have lengthwise motion only, and limiting the described inverse toggle action to the unsupported intermediate portion of the cable. If necessary to avoid the engine, the cable 48 may be run down one side of the car beside the engine, as shown in Figure 3, a pulley 54 or other guiding means being provided to equalize the effective lengths of cable forming the links of the inverse toggle.

An emergency lever or the like 56 may if desired be connected to one or both of the transverse cables, independently of the pedal connections.

In order to minimize friction in the conduits 52, I prefer to provide a lubricant such as metallic mercury, or a mercury salt sufficiently unstable to yield metallic mercury in use, which will amalgamate with the metal of the cable and of the conduit to reduce the coefficient of friction. This does not interfere with the use at the same time of any desired grease or other conventional lubricant.

While one illustrative embodiment has been described in detail, it is not my intention to limit the scope of the invention to that particular embodiment, or otherwise than by the terms of the appended claims.

I claim:

1. A vehicle having a pair of brakes, each of which has an operating toggle moving toward straightened position in applying the brakes, and operating connections between and actuating said toggles and including parts forming in effect an inverse toggle moving away from straightened position in applying the brakes, whereby the inverse toggle substantially compensates for the varying action of the two brake toggles and maintains the leverage of the system substantially constant throughout the operation of applying the brakes.

2. A vehicle having a pair of brakes, each of which has an operating toggle moving toward straightened position in applying the brakes, and a cable extending between and actuating said toggles and an actuating device pulling on the cable so that parts of the cable form in effect an inverse toggle moving away from straightened position in applying the brakes, whereby the inverse toggle substantially compensates for the varying action of the two brake toggles and maintains the leverage of the system substantially constant throughout the operation of applying the brakes.

3. A vehicle having a pair of brakes, each of which has an operating toggle moving toward straightened position in applying the brakes, and a cable extending between and actuating said toggles and an actuating device pulling on the cable so that parts of the cable form in effect an inverse toggle moving away from straightened position in applying the brakes, whereby the inverse toggle substantially compensates for the varying action of the two brake toggles and maintains the leverage of the system substantially constant throughout the operation of applying the brakes, together with flexible cable conduits housing the ends of the cable adjacent the brakes and constraining said ends to have effective brake-applying movement in a lengthwise direction only.

4. A vehicle having right and left brakes having backing plates provided with friction means and actuating toggles moving toward each other and toward straightened positions in actuating the friction means to apply the brakes, a transverse cable having its ends connected to the knuckles of the two toggles, means to support the ends of the cable to have lengthwise motion only to actuate the toggles and leaving an unsupported intermediate portion having an actuator adjacent its center moving transversely of the cable to pull on the unsupported portion with the parts of said portion on opposite sides of the actuator forming in effect an inverse toggle moving away from straightened position in applying the brake, so that thereby the action of the inverse toggle automatically substantially compensates for the varying action of the two brake toggles and the leverage of the system is maintained substantially constant throughout the operation of applying the brake.

5. A vehicle having right and left brakes having backing plates provided with friction means and actuating toggles moving toward each other and toward straightened positions in actuating the friction means to apply the brakes, a transverse cable having its ends connected to the knuckles of the two toggles, flexible conduits inclosing and arranged to support the ends of the cable to permit lengthwise motion thereof to actuate the toggles, and an actuator engaging the cable to apply the brakes.

ROY S. SANFORD.